(12) United States Patent
Mathiesen et al.

(10) Patent No.: US 9,752,698 B2
(45) Date of Patent: Sep. 5, 2017

(54) AUTONOMOUS VALVE WITH TEMPERATURE RESPONSIVE DEVICE

(75) Inventors: Vidar Mathiesen, Porsgrunn (NO); Haavard Aakre, Skien (NO); Bjørnar Werswick, Langesund (NO)

(73) Assignee: STATOIL PETROLEUM AS, Stavanger (NO)

( * ) Notice: Subject to any disclaimer, the term of this patent is extended or adjusted under 35 U.S.C. 154(b) by 149 days.

(21) Appl. No.: 14/343,688

(22) PCT Filed: Sep. 8, 2011

(86) PCT No.: PCT/EP2011/065523
§ 371 (c)(1),
(2), (4) Date: Apr. 3, 2014

(87) PCT Pub. No.: WO2013/034185
PCT Pub. Date: Mar. 14, 2013

(65) Prior Publication Data
US 2014/0209822 A1     Jul. 31, 2014

(51) Int. Cl.
*F16K 31/00*     (2006.01)
*E21B 34/08*     (2006.01)
*E21B 43/12*     (2006.01)

(52) U.S. Cl.
CPC ............ *F16K 31/002* (2013.01); *E21B 34/08* (2013.01); *E21B 43/12* (2013.01)

(58) Field of Classification Search
CPC ......... F16K 31/002; E21B 43/12; E21B 34/08
See application file for complete search history.

(56) References Cited

U.S. PATENT DOCUMENTS

| | | | | |
|---|---|---|---|---|
| 2,526,099 | A | * | 10/1950 | Vinson ................. G05D 23/136 137/505 |
| 4,512,155 | A | * | 4/1985 | Sheinbaum ............. E21B 36/00 417/109 |
| 8,689,813 | B2 | * | 4/2014 | Kim ......................... E03B 7/10 137/62 |

(Continued)

FOREIGN PATENT DOCUMENTS

| WO | WO 2008/004875 A1 | 1/2008 |
|---|---|---|
| WO | WO 2010/053378 A2 | 5/2010 |
| WO | WO 2011/098328 A2 | 8/2011 |

*Primary Examiner* — Jessica Cahill
*Assistant Examiner* — Daphne M Barry
(74) *Attorney, Agent, or Firm* — Birch, Stewart, Kolasch & Birch, LLP (57) ABSTRACT

A self-adjustable valve or flow control device for controlling the flow of a fluid from one space or area to another by exploiting the Bernoulli principle, to control the flow of fluid, such as oil and/or gas including any water, from an oil or gas reservoir and into a production pipe of a well in the oil and/or gas reservoir, from an inlet port on an inlet side to an outlet port on an outlet side of the device. The valve includes a movable valve body arranged to be acted on by a temperature responsive device. The valve body is arranged to be actuated towards its closed position by the temperature responsive device in response to a predetermined increase in temperature in the fluid surrounding and/or entering the valve. The temperature responsive device includes an expandable device including a sealed structure at least partially filled with an expandable material.

13 Claims, 4 Drawing Sheets

(56) References Cited

U.S. PATENT DOCUMENTS

| | | | |
|---|---|---|---|
| 2009/0218089 A1 | 9/2009 | Steele et al. | |
| 2009/0218103 A1* | 9/2009 | Aakre | E21B 34/08 166/373 |
| 2009/0250224 A1 | 10/2009 | Wright et al. | |
| 2012/0025113 A1* | 2/2012 | Stadelbauer | F16K 31/002 251/11 |
| 2013/0126184 A1* | 5/2013 | Gerrard | E21B 34/08 166/373 |
| 2013/0221118 A1* | 8/2013 | Villaire | F16K 31/002 236/93 R |
| 2013/0334327 A1* | 12/2013 | Lamb | F03G 7/06 236/99 K |
| 2014/0216733 A1* | 8/2014 | Mathiesen | E21B 34/08 166/252.5 |
| 2014/0230907 A1* | 8/2014 | Tallos | F16K 31/002 137/2 |

\* cited by examiner

AUTONOMOUS VALVE WITH TEMPERATURE RESPONSIVE DEVICE

TECHNICAL FIELD

The present invention relates to a temperature responsive autonomous valve arrangement and method. The valve may for example be used for achieving constant mass flow of hydrocarbons into a production line in a wellbore.

BACKGROUND ART

Devices for recovering of oil and gas from long, horizontal and vertical wells are known from U.S. Pat. Nos. 4,821,801, 4,858,691, 4,577,691 and GB patent publication No. 2169018. These known devices comprise a perforated drainage pipe with, for example, a filter for control of sand around the pipe. A considerable disadvantage with the known devices for oil/and or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. The total oil and/or gas produced by this means will therefore be low. With thin oil zones and highly permeable geological formations, there is further a high risk of coning, i. e. flow of unwanted water or gas into the drainage pipe downstream, where the velocity of the oil flow from the reservoir to the pipe is the greatest.

When extracting oil from reservoirs by injection of steam or using combustion, the differential pressure can vary along the drainage pipe. This may cause problems should injected steam or combustion gas reach the valves used for draining fluid from the reservoir into the production pipe, as many such valves are not able to close to prevent steam or combustion gas from entering the production pipe. In particular, if the differential pressure is relatively low, ingress of steam or combustion gas can lead to a "short circuit" of the injection pressure and the production pressure. This will cause the differential pressure to drop even further, which has a negative effect on the efficiency of the drainage process (injected energy vs. produced oil volume).

A further result of areas with low pressure differential combined with high temperature, or hot spots, is that fluid with low viscosity from high temperature regions of the reservoir will dominate the inflow into the production pipe. In this way, the production pipe will have an undesirable inflow profile along its length.

From World Oil, vol. 212, N. 11 (November 1991), pages 73-80, is previously known to divide a drainage pipe into sections with one or more inflow restriction devices such as sliding sleeves or throttling devices. However, this reference is mainly dealing with the use of inflow control to limit the inflow rate for up hole zones and thereby avoid or reduce coning of water and or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevents the running of work-over tools operated along the outer surface of the production pipe.

Devices as disclosed in WO2009/088292 and WO 2008/004875 are robust, can withstand large forces and high temperatures, can prevent draw downs (variations in differential pressure), need no energy supply, can withstand sand production, yet are reliable, simple and very cheap. However, several improvements might nevertheless be made to increase the performance and longevity of the above device in which many of the different embodiments of WO2009/088292 and WO 2008/004875 describe a disc as the movable body of the valve.

When extracting oil and or gas from geological production formations, fluids of different qualities, i.e. oil, gas, water (and sand) is produced in different amounts and mixtures depending on the property or quality of the formation. None of the above-mentioned, known devices are able to distinguish between and control the inflow of oil, gas or water on the basis of their relative composition and/or quality. In particular, the known devices are not able to perform a satisfactory control of variations in inflow into the production pipe due to variations of differential pressure caused by temperature variations. WO 2008/004875 does disclose a temperature responsive valve, but the suggested solution involves bending the movable valve body by means of a bi-metallic element. The suggested solution is relatively complex and requires an expensive valve body that is susceptible to wear caused by repetitive deformation. WO 2005/103443 discloses a temperature responsive valve where the material of a valve body has a linear expansion coefficient that is greater than that of the well pipe material. When the temperature increases, the valve body expands more than the well pipe and moves in the direction of its closed position covering the opening. This solution will give a relatively long response time, causing large quantities of gas and/or hot liquid to enter the drainage pipe to disturb the flow through the drainage pipe.

The present invention provides an improved valve arrangement which aims to minimize problems relating to variations in inflow into the production pipe due to temperature variations.

SUMMARY OF THE INVENTION

The invention provides a self-adjustable valve and method as set out in the accompanying claims.

The present invention is preferably provided an inflow control device, or valve, which is self adjusting or autonomous. The invention can also be adapted to other types of controllable valves suitable for this purpose. A common feature for the valves according to the invention is the ability to automatically close the valve and prevent inflow into a production pipe in response to an increase in temperature of the fluid surrounding and/or entering the valve arrangement. The inflow control devices can easily be fitted in the wall of a production pipe and allows the use of work-over tools. The device is designed to "distinguish" between the oil and/or gas and/or water and is able to control the flow or inflow of oil or gas, depending on which of these fluids such flow control is required.

According to a preferred embodiment, the invention relates to a self-adjustable valve or flow control device controlling the flow of a fluid from one space or area to another by exploiting the Bernoulli principle, in order to control the flow of fluid, i.e. oil and/or gas including any water, from a reservoir and into a production pipe of a well in the oil and/or gas reservoir. The production pipe can comprise a lower drainage pipe preferably being divided into one or more sections each including one or more inflow control devices which allow fluid communication between the geological production formation and the interior flow space of the drainage pipe. Fluid can flow between an inlet port on an inlet side, facing the formation, to an outlet port on an outlet side of the device, facing the interior of the production pipe. The valve further comprises a movable valve body arranged to be acted on by a temperature responsive device. The valve body is arranged to be actuated towards its closed position by the temperature responsive device in response to a predetermined increase in temperature in the fluid surrounding and/or entering the valve.

The temperature responsive device may comprise a sealed expandable means at least partially filled with a material that is arranged to undergo a significant expansion when the temperature in the fluid surrounding the device increases. Preferably, the expansion should be sufficient to substantially or fully close the valve when the temperature in the fluid surrounding the temperature responsive device increases above a predetermined value. Such an expansion can, for instance, be achieved by selecting a material that undergoes a phase change at a predetermined temperature. An example of such a phase change is a liquid which will boil at or above a predetermined temperature. The fluid material is selected dependent on where the production pipe is located. For instance, a production pipe located at a depth of 300 meters can be subjected to pressures of 25-30 bar and temperatures of 250-290° C. during normal production conditions. In order to prevent a sudden influx of steam having a higher temperature through the valve, the expandable means can be filled with an alcohol-water mixture that boils at e.g. 280° C. During an undesirable increase of temperature in the fluid flowing through the valve, the expandable means is arranged to expand and cause a displacement of the movable valve body towards its closed position when the temperature of the fluid exceeds said predetermined temperature. In this way, the valve can be closed to prevent boiling or flashing water from entering the production pipe. Flashing or boiling can occur when the differential pressure across the inflow control device is relatively low. If boiling or flashing water is allowed to enter the production pipe, then this causes a "short circuit" of the injection pressure and the production pressure and causes the differential pressure to drop further. This has a negative effect on the efficiency of the drainage process, as outlined above. Other undesirable fluids that can be prevented from entering the production pipe are hot production gases or combustion gases used for increasing the production rate.

In order to control the opening and closing of the valve with varying temperatures, the expandable means may be arranged in contact with the fluid surrounding the production pipe or flowing through the valve.

According to a first example, the expandable means is arranged in a fluid chamber in the valve, which chamber contains the movable valve body controlling the fluid flow through the valve. This example will typically be used for autonomous valves comprising a chamber containing a movable valve body in the form of a flat circular disc or a conical body with a flat base. The position of the movable valve body is normally controlled by an inflow of fluid from an inlet located facing the centre of the movable valve body and flowing radially outwards over at least a portion of the movable valve body and towards an outlet. An example of such a movable valve body or disc is shown in WO 2008/004875 A1 and will be described in further detail below. In this example, the expandable means is located on the opposite side of the disc relative to the fluid inlet. The expandable means can be attached to a portion of the fluid chamber and expandable into contact with the movable valve body. Alternatively, the expandable means can be attached to the movable valve body and expandable into contact with fluid chamber.

When an undesirable increase of temperature in the fluid flowing through the valve occurs, heat is transferred by the hot fluid to the expandable means, partially through the movable valve body and partially around the outer edges thereof to the space between the chamber and the movable valve body where the expandable means is located. If the expandable means contains a fluid, the said fluid will undergo a phase change and begin to boil when the fluid flowing through the valve exceeds a predetermined temperature. This causes the expandable means to expand due to the increase in pressure and volume inside said expandable means. As the expandable means expands it will displace the movable valve body towards its closed position and, if the temperature increase is sufficient, eventually close the valve.

According to a second example, the expandable means is arranged in a fluid conduit in series with the fluid flow through a valve. In this example, the expandable means is located in a conduit through which the entire or a part of the fluid flow passes, before passing through the valve to be controlled. The expandable means is directly or indirectly connected to a movable valve body or to an actuator controlling said valve, in order to act on said valve body to close the valve. As the expandable means expands it will urge the movable valve body towards its closed position and, if the temperature increase is sufficient, eventually close the valve.

According to a third example, the expandable means is arranged in a fluid conduit in parallel with the main fluid flow through a valve. In this example, the expandable means is located in a conduit through which a part of the fluid flow passes, which partial flow bypasses the valve to be controlled. The expandable means is directly or indirectly connected to a movable valve body or to an actuator controlling said valve, in order to act on said valve body to close the valve. As the expandable means expands it will urge the movable valve body towards its closed position and, if the temperature increase is sufficient, eventually close the valve.

According to one embodiment, the expandable means contains a fluid having a lower boiling point than a hot fluid, such as water, at the pressure in the reservoir surrounding the production pipe. As indicated above, the said fluid will undergo a phase change and begin to boil when the hot fluid from the formation flows through the valve inlet and past the expandable means exceeds a predetermined temperature. The increase in gas pressure inside the expandable means, caused by the evaporating fluid, will in turn cause an increase in volume of expandable means. This will result in a displacement of a movable valve body in contact with or acted directly or indirectly on by the expandable means. The fluid can comprise a suitable alcohol, an alcohol/water mixture or acetone. The fluid is selected depending on its boiling point at a predetermined pressure, which pressure is dependent on the pressure acting on the production pipe at the location of the valve, or inflow device. The properties of the material selected determines the rate at which the valve can be closed. In this way. the use and the desired reaction speed of the autonomous valve may determine which material used.

The expandable means can be a sealed container at least partially filled with a fluid material. The container can have a predetermined general shape with at least a portion being resiliently deformable, or be in the form of a bag with a non-specified shape, which container is arranged to expand in a predetermined direction with increasing temperatures. The container can have a predetermined basic shape, such as a cylinder, with corrugated or undulating sides extending around its circumference to allow expansion in a predetermined direction. In the case of a valve with a movable valve body in the form of a disc located in a chamber, the end surfaces of the cylinder may be arranged to contact the movable valve body and the chamber, respectively. The cylinder can then be operated as a bellows arranged to expand in a predetermined direction.

Alternatively the expandable means can be a sealed flexible or resilient container such as a bag. Such a resilient container can have a substantially shapeless form, arranged to expand in all directions. When heated above said predetermined temperature, the container is arranged to expand uniformly until constricted between a fixed surface and a component to be displaced. In the case of a valve with a movable valve body in the form of a disc located in a chamber, the container will be constricted by a chamber wall and the disc. Further expansion of the container causes displacement of disc. A flexible or resilient container of this type can also have at least one reinforced portion to facilitate attachment of the container. A further reinforced portion can be provided to ensure contact between the expanding portion of the container and the movable valve body or actuator to be displaced.

As indicated above, the container making up the expandable means can be attached to a portion of the fluid chamber and expandable into contact with a movable valve body. Alternatively, the expandable means can be attached to the movable valve body and expandable into contact with a wall in the fluid chamber. These alternatives are preferable for containers having a basic shape, with a predetermined direction of expansion. According to a further alternative, the expandable means can be held in a desired position by locating means on the movable valve body or the chamber wall, without being physically attached to either component. This alternative is preferable for containers having a substantially shapeless form, which can expand uniformly in all directions.

BRIEF DESCRIPTION OF THE DRAWINGS

Embodiments of the invention will now be described in detail, by way of example only, with reference to the attached figures. It is to be understood that the drawings are designed solely for the purpose of illustration and are not intended as a definition of the limits of the invention. It should be further understood that the drawings are not necessarily drawn to scale and that, unless otherwise indicated, they are merely intended to schematically illustrate the structures and procedures described herein.

DETAILED DESCRIPTION

Figure 1:
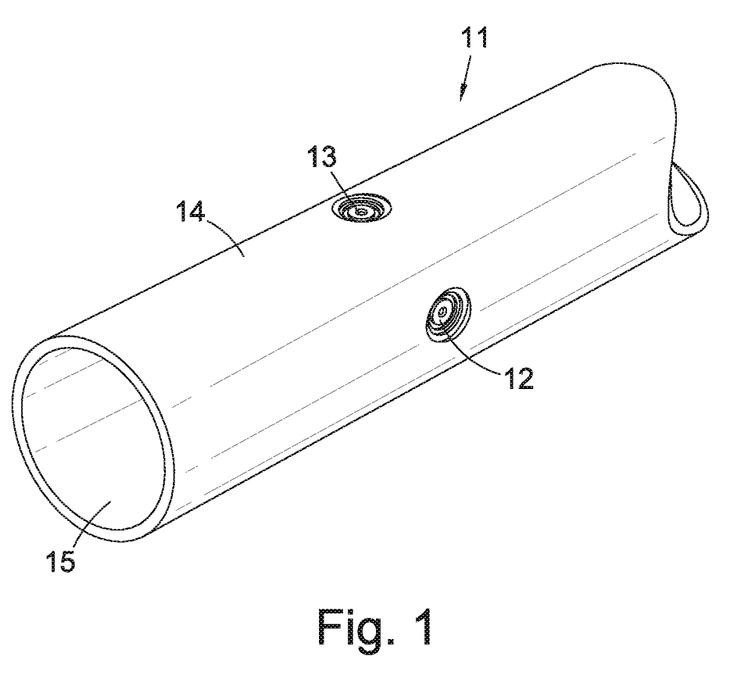
FIG. 1 shows an autonomous valve arrangement provided with a flow control device according to the invention.

FIG. 1 shows a production pipe 11 provided with an opening in which an autonomous valve arrangement 12 according to the invention. The valve arrangement 12 is particularly useful for controlling the flow of fluid from a subterranean reservoir and into a production pipe 11 of a well in the oil and/or gas reservoir, between an inlet port 13 on an inlet side to at least one outlet port (not shown) on an outlet side of the autonomous valve arrangement 12. The component part making up the entire autonomous valve arrangement is subsequently referred to as a "valve arrangement", while the active components required for controlling the flow are commonly referred to as a "flow control device". The inlet side of the autonomous valve arrangement 12 is located in the opening on the outer side 14 of the production pipe 11, while the outlet side is located on the inner side 15 of the production pipe 11. In the subsequent text, terms such as "inner" and "outer" are used for defining positions relative to the inner and outer surface of the valve arrangement when mounted in a pipe 11 (see FIG. 1). A valve suitable for use in the embodiments referred to in this first example can be of the type described in the published application WO 2008/004875 or in the filed international application PCT//EP2011/050471.

Figure 2A:
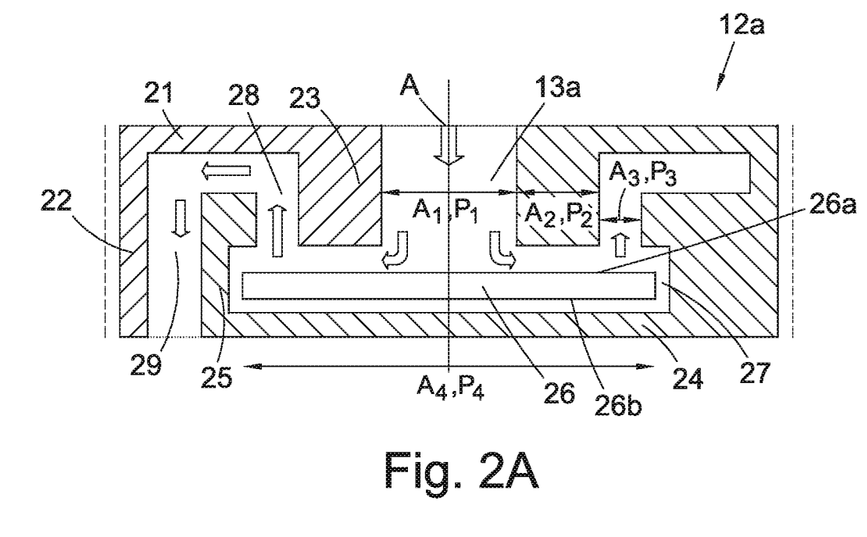
FIG. 2A shows a cross-section through a first valve arrangement.

FIG. 2A shows a cross-section through a valve arrangement 12a as described in WO 2008/004875. The device consists of first disc-shaped housing body 21 with an outer cylindrical segment 22 and inner cylindrical segment 23 and with a central hole or inlet port 13a and a second disc-shaped holder body 24 with an outer cylindrical segment 25, as well as a preferably flat disc or freely movable valve body 26 provided in an open recess or chamber 27 formed between the first 21 and second 24 disc-shaped housing and holder bodies. The valve body 26 may for particular applications and adjustments depart from the flat shape and have a partly conical or semicircular surface facing the inlet port 13a. As can be seen from the figure, the cylindrical segment 25 of the second disc-shaped holder body 24 fits within and extends in the opposite direction of the outer cylindrical segment 22 of the first disc-shaped housing body 21 thereby forming a flow path as shown by the arrows A, where the fluid enters the control device through the central hole or inlet port 13a and flows towards and radially along the disc 26 before flowing through an annular opening 28 formed between the cylindrical segments 23 and 25 and further out through the annular opening, or outlet port 29 formed between the cylindrical segments 22 and 25. In FIG. 2A the right hand side of the outlet port 29 appears to be blocked off, but this is only because the cross-section is taken at a position where there is a solid supporting portion (which is one of three such supporting portions) between the cylindrical segments 22 and 25. Therefore the outlet port 29 is not blocked, and is indeed annular. In a later version of this valve there are no such supporting portions, and the outlet port 29 is open all the way around. The two disc-shaped housing and holder bodies 21, 24 are attached to one another by a screw connection, welding or other means (not shown in the figure). The entire valve assembly is removably mounted in an opening through a production pipe by means of a threaded connection indicated in FIG. 2A.

In operation, the inlet port 13a is connected to the recess 27 by a central aperture or opening, wherein the fluid is arranged to flow into the recess 27 through the central aperture from the formation. The fluid is then arranged to flow out of the recess 27 radially across a portion of a first surface 26a of the valve body, said first surface facing the inlet port 13a, and through an annular opening 28 in said valve body towards an annular outlet port 29.

The present invention exploits the effect of Bernoulli teaching that the sum of static pressure, dynamic pressure and friction is constant along a flow line:

$$\sum_p = p_{static} + \frac{1}{2}\rho v^2 + \Delta p_{friction} \quad (1)$$

With reference to the valve shown in FIG. 2A, when subjecting the movable valve body or disc 26 to a fluid flow, which is the case with the present invention, the pressure difference over the disc 26 can be expressed as follows:

$$\Delta p_{under} = [p_{under(f(p4))} - p_{over(f(p1,p2,p3))}] = \frac{1}{2}\rho v^2 \quad (2)$$

Due to lower viscosity, a fluid such as gas will flow faster along the disc towards the outlet. This results in a reduction of the pressure on the area A2 above the disc while the pressure acting on the area A3 below the disc 28 remains static. As the disc 26 is freely movable within the recess it will move upwards and thereby narrow the flow path between the disc 26 and the first surface 26a of the recess 26. Thus, the disc 26 moves downwards or upwards depending on the viscosity of the fluid flowing through, whereby this principle can be used to control the flow of fluid through of the device.

Further, the pressure drop through a traditional inflow control device (ICD) with fixed geometry will be proportional to the dynamic pressure:

$$\Delta p = K \frac{1}{2}\rho v^2 \quad (3)$$

where the constant, K is mainly a function of the geometry and less dependent on the Reynolds number. In the control device according to the present invention the flow area will decrease when the differential pressure increases, such that the volume flow through the control device will not, or nearly not, increase when the pressure drop increases. Hence, the flow-through volume for the present invention is substantially constant above a given differential pressure. This represents a major advantage with the present invention as it can be used to ensure a substantially constant volume flowing through each section for the entire horizontal well, which is not possible with fixed inflow control devices.

When producing oil and gas the flow control device according to the invention may have two different applications: Using it as inflow control device to reduce inflow of water or gas, or to maintain a constant flow through the flow control device. When designing the control device according to the invention for the different applications, such as constant fluid flow, the different areas and pressure zones will have impact on the efficiency and flow through properties of the device. The different area/pressure zones (indicated in FIG. 2A) may be divided into:

A1, P1 is the inflow area and pressure respectively. The force (P1*A1) generated in the inlet port 13a by this pressure will strive to open the control device (move the disc or body 28 downwards).

A2, P2 is the area and pressure in the zone between the first surface 26a of the disc and the recess 27, where the velocity will be largest and hence represents a dynamic pressure source. This area is located between the inlet port 13a and the annular opening 28 out of the recess 27. The resulting dynamic pressure will strive to close the control device by moving the disc or body 26 upwards as the flow velocity increases and the pressure is reduced.

A3, P3 is the area and pressure at the annular opening 28 out of the recess 27. The pressure should be the same as the well pressure (inlet pressure).

A4, P4 is the area and pressure behind the movable disc or body 26, between a second surface 26b (opposite the first surface 26a) of the disc 26 and the recess 27. The pressure behind the movable disc or body should be the same as the well pressure (inlet pressure). This will strive to move the body upwards, towards the closed position of the control device as the flow velocity increases.

Fluids with different viscosities will provide different forces in each zone depending on the design of these zones, in order to optimize the efficiency and flow through properties of the control device, the design of the areas will be different for different applications, e.g. constant volume flow, or gas/oil or oil/water flow. Hence, for each application the areas needs to be carefully balanced and optimally designed taking into account the properties and physical conditions (viscosity, temperature, pressure etc.) for each design situation.

Figure 2B:
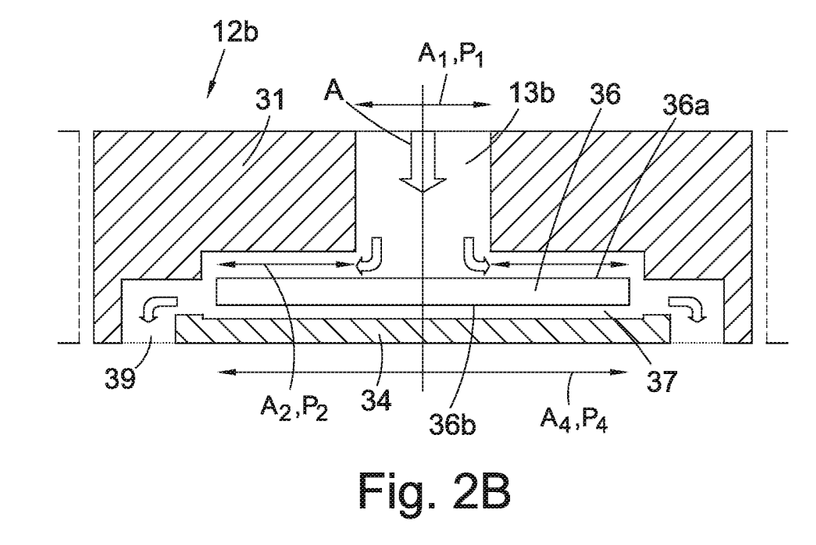
FIG. 2B shows a cross-section through a second valve arrangement.

FIG. 2B shows a cross-section through a valve arrangement 12a as described in PCT//EP2011/050471. The device consists of first disc-shaped housing body 31 with a central hole or inlet port 13b and a second disc-shaped holder body 34, as well as a preferably flat disc or freely movable valve body 36 provided in an open recess or chamber 37 formed between the first disc-shaped housing 31 and second holder body 34. The valve body 36 may for particular applications and adjustments depart from the flat shape and have a partly conical or semicircular surface facing the inlet port 13b. A flow path through the valve arrangement is shown by the arrows A, where the fluid enters the control device through the central hole or inlet port 13b and flows towards and radially over the outer periphery of the disc 26 before flowing through radial openings 39 formed in the second holder body 34. The entire valve assembly is removably mounted in an opening through a production pipe by means of a threaded connection indicated in FIG. 2B.

In operation, the inlet port 13b is connected to the recess by a central aperture or opening, wherein the fluid is arranged to flow into the recess 37 through the central aperture from the formation. The fluid is then arranged to flow out of the recess radially across a first surface 26a of the valve body, said first surface facing the central aperture, and past the outer peripheral surface of said valve body towards at least one outlet port 39, which can be radially (FIG. 2B) or axially oriented in the valve arrangement.

The valve arrangement in FIG. 2B exploits the Bernoulli effect, in the same way as the valve in FIG. 2A, teaching that the sum of static pressure, dynamic pressure and friction is constant along a flow line. The main difference between these valves is that the calculations for determining the pressure difference across the disc does not include the area A3 (FIG. 2A), as the outlet is located outside the periphery of the disc. Also, the valve arrangement shown in FIG. 2B does not use the static pressure on the area A4, below the disc, as the fluid leaves the chamber 37 radially outside the disc 26.

FIGS. 2A and 2B illustrate the normal function of an autonomous valve of this type. The operation of such a valve arrangement provided with a heat expandable means according to the invention is described in connection with FIGS. 3A and 3B.

Figure 3A:
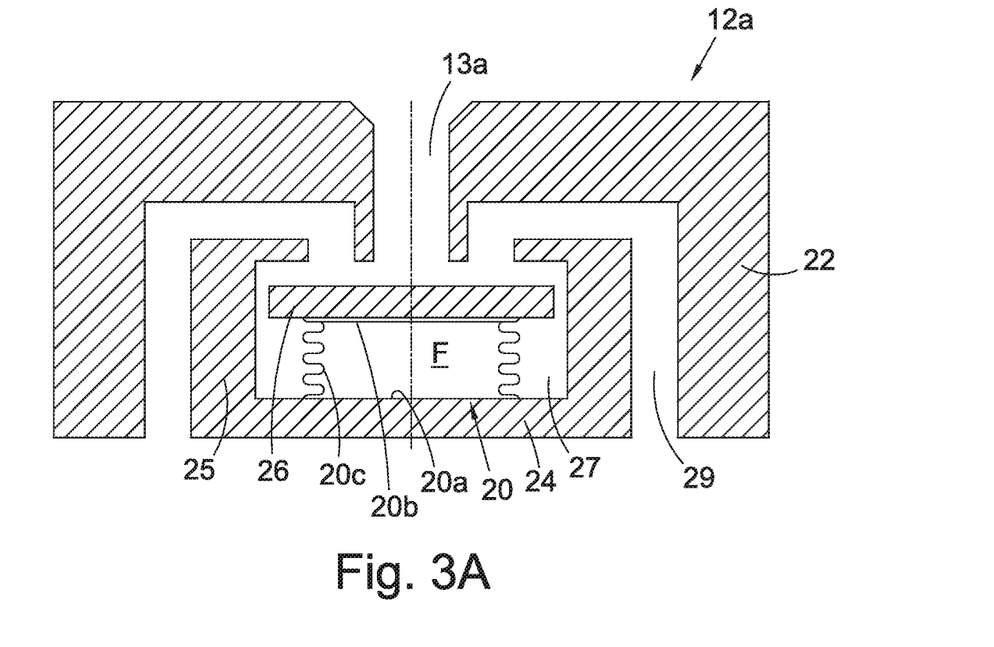
FIG. 3A shows a valve arrangement as shown in FIG. 2A provided with a heat expandable means according to a first embodiment of the invention.

FIG. 3A shows a valve arrangement as shown in FIG. 2A provided with a heat expandable means according to a first embodiment of the invention. For corresponding parts of the valve, the same reference numbers are used. According to this example, an expandable means in the form of a bellows 20 is arranged in a fluid chamber 27 in the valve, which chamber contains a movable valve body in the form of a disc 26 controlling the fluid flow through the valve. The position of the disc 26 is normally controlled by an inflow of fluid from an inlet port 13a located facing the centre of the disc 26 and flowing radially outwards over at least a portion of the disc 26 and towards an outlet port 29. In this example, the bellows 20 is located on the opposite side of the disc 26 relative to the fluid inlet port 13a. The bellows 20 comprises a first and a second substantially flat end surface 20a and 20b, which are connected by a corrugated section 20c. The sealed, expandable bellows 20 is at least partially filled with a fluid material that is arranged to undergo a phase change at a predetermined temperature. In this case the first end surface 20a of the bellows 20 is attached to a wall section of the fluid chamber 27 and is expandable into contact with the disc 26. Alternatively, the expandable means can be attached to the disc and expandable into contact with a wall section of the fluid chamber.

When an undesirable increase of temperature in the fluid flowing through the valve occurs, heat is transferred by the hot fluid to the bellows 20, partially through the disc 26 and partially around the outer edges thereof to the space between the chamber 27 and the disc 26 where the expandable means is located. If the expandable means contains a liquid, said liquid will begin to boil when the fluid flowing through the valve exceeds a predetermined temperature. This causes the bellows 20 to expand due to the increase in pressure and volume inside said bellows 20. As the bellows 20 expands it will displace the disc 26 towards its closed position and, if the temperature increase is sufficient, eventually close the valve.

The method of attachment of the bellows to a wall section as described here can also be used for the embodiment shown in FIG. 3B below.

Figure 3B:
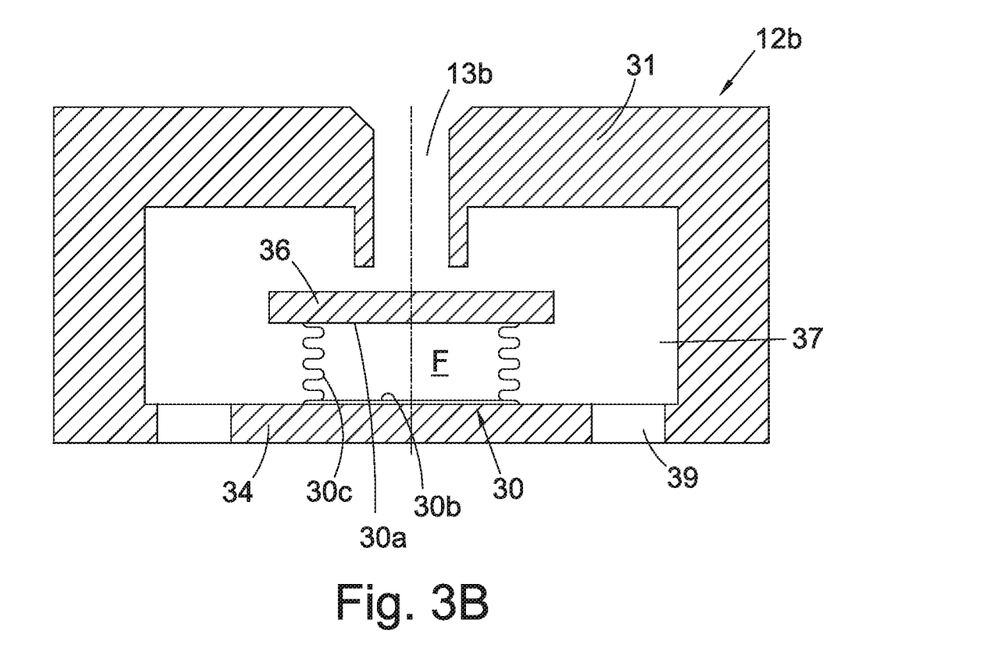
FIG. 3B shows a valve arrangement as shown in FIG. 2B provided with a heat expandable means according to a second embodiment of the invention.

FIG. 3B shows a valve arrangement as shown in FIG. 2B provided with a heat expandable means according to a second embodiment of the invention. For corresponding parts of the valve, the same reference numbers are used. According to this example, an expandable means in the form of a bellows 30 is arranged in a fluid chamber 37 in the valve, which chamber contains a movable valve body in the form of a disc 36 controlling the fluid flow through the valve. The position of the disc 36 is normally controlled by an inflow of fluid from an inlet port 13a located facing the centre of the disc 36 and flowing radially outwards over at least a portion of the disc 36 and towards an outlet port 39. In this example, the bellows 30 is located on the opposite side of the disc 36 relative to the fluid inlet port 13a. The bellows 30 comprises a first and a second substantially flat end surface 30a and 30b, which are connected by a corrugated section 30c. The sealed, expandable bellows 30 is at least partially filled with a fluid material that is arranged to undergo a phase change at a predetermined temperature. In this case the first end surface 30a of the bellows 30 is attached to the disc 36 and is expandable into contact with a wall section of the fluid chamber 37. Alternatively, the expandable means can be attached to the disc and expandable into contact with a wall section of the fluid chamber.

When an undesirable increase of temperature in the fluid flowing through the valve occurs, heat is transferred by the hot fluid to the bellows 30, partially through the disc 36 and partially around the outer edges thereof to the space between the chamber 37 and the disc 36 where the expandable means is located. If the expandable means contains a liquid, said liquid will begin to boil when the fluid flowing through the valve exceeds a predetermined temperature. This causes the bellows 30 to expand due to the increase in pressure and volume inside said bellows 30. As the bellows 30 expands it will displace the disc 36 towards its closed position and, if the temperature increase is sufficient, eventually close the valve.

The method of attachment of the bellows to the disc as described here can also be used for the embodiment shown in FIG. 3A above.

The expandable means described in connection with FIGS. 3A and 3B is a sealed container in the form of a bellows, at least partially filled with a fluid material. Alternatively, the container can have a predetermined general shape with at least a portion being resiliently deformable, or be in the form of a bag with a non-specified shape. In this case, the expandable means can be held in a desired position by locating means on the movable valve body or the chamber wall, without being physically attached to either component. For example, the expandable means can be maintained in position by locating means in the form of a number of projections extending into the chamber to support the movable valve body in its end position where the valve is fully open. Examples of such supporting projections can be found in the filed international application PCT//EP2011/050471. This alternative is preferable for expandable means having a substantially shapeless form, which can expand uniformly in all directions.

Figure 4:
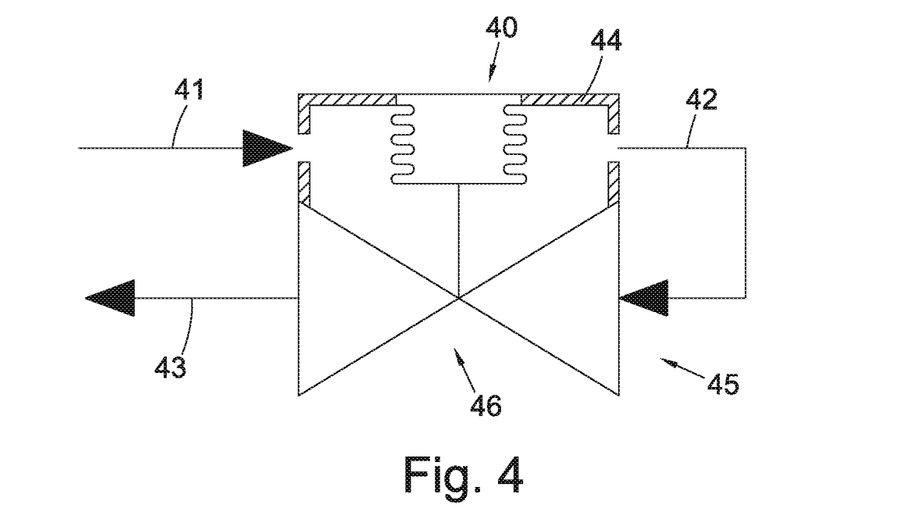
FIG. 4 shows a valve arrangement provided with a heat expandable means according to a third embodiment of the invention.

FIG. 4 shows a valve arrangement provided with a heat expandable means according to a third embodiment of the invention. The valve arrangement is arranged to be mounted in a production line (not shown). According to this embodiment, a heat expandable means in the form of a bellows 40 is arranged in a fluid conduit 41, 42, 43 in series with the fluid flow through the valve arrangement. In this example, the bellows 40 is located in a housing 44 supplied by a first conduit 41 through which the entire fluid flow from the formation passes, before passing to a valve 45 to be controlled through a second conduit 42. The fluid flow leaves the valve 45 through a third conduit 43 and enters the production pipe. The bellows 40 is connected to a movable valve body 46 (schematically indicated) in order to act on said valve body to close the valve 45. When an increase of temperature in the fluid flowing through the housing 44 and the valve 45 occurs, heat is transferred by the hot fluid to a liquid inside the bellows 40. When the fluid flowing through the valve exceeds a predetermined temperature, the liquid in the bellows 40 will begin to boil. This causes the bellows 40 to expand due to the increase in pressure and volume inside said bellows 40. As the bellows 40 expands it will urge the movable valve body 46 towards its closed position and, if the temperature increase is sufficient, eventually close the valve 45.

Figure 5:
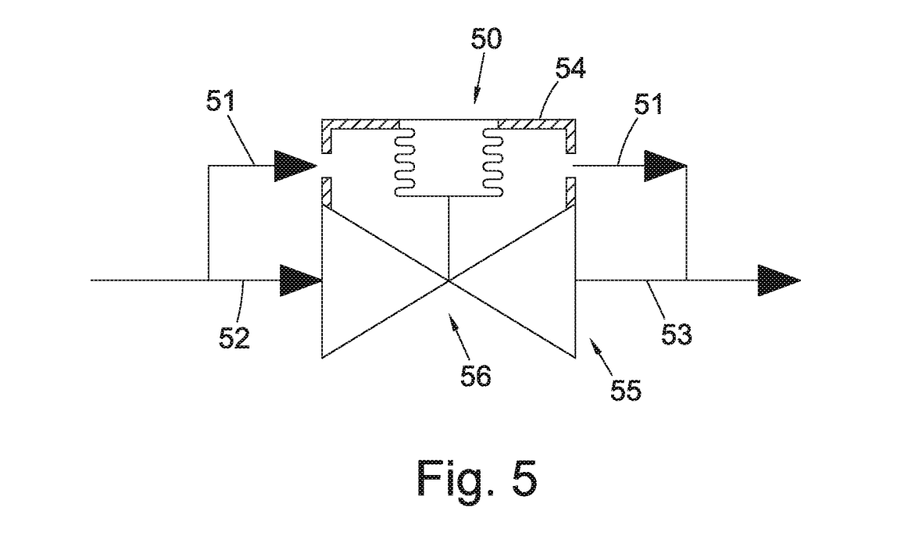
FIG. 5 shows a valve arrangement provided with a heat expandable means according to a fourth embodiment of the invention.

FIG. 5 shows a valve arrangement provided with a heat expandable means according to a fourth embodiment of the invention. The valve arrangement is arranged to be mounted in a production line (not shown). According to this embodiment, a heat expandable means in the form of a bellows 50 is arranged in a fluid conduit 51 in parallel with a main conduit 52, 53 supplying fluid flow through a valve 55. In this example, the bellows 50 is located in a housing 54 supplied by a first conduit 51 through which a part of the fluid flow from the formation passes, which partial flow bypasses the valve 55 to be controlled. A second conduit 52 supplies the main fluid flow to the valve 55. The main fluid flow leaves the valve 55 through a third conduit 53, which is rejoined by the first conduit 51 before entering the production pipe. The bellows 50 is connected to a movable valve body 56 (schematically indicated) in order to act on said valve body to close the valve 55. When an increase of temperature in the fluid flowing through the housing 54 and the valve 55 occurs, heat is transferred by the hot fluid to a liquid inside the bellows 50. When the fluid flowing through the housing 54 exceeds a predetermined temperature, the liquid in the bellows 50 will begin to boil. This causes the bellows 50 to expand due to the increase in pressure and volume inside said bellows 50. As the bellows 50 expands it will urge the movable valve body 56 towards its closed position and, if the temperature increase is sufficient, eventually close the valve 55.

The invention claimed is:

1. A self-adjustable valve for controlling the flow of a fluid from one space or area to another by exploiting the Bernoulli principle, to control the flow of fluid from an oil or gas reservoir and into a production pipe of a well in the oil and/or gas reservoir, from an inlet port on an inlet side to an outlet port on an outlet side of the device, the valve comprising the inlet port and the outlet port, wherein the valve comprises a movable valve body arranged to be acted on by a temperature responsive device, and wherein the moveable valve body is arranged to be actuated towards a closed position by the temperature responsive device in response to a predetermined increase in temperature in the fluid surrounding and/or entering the valve, said closed position being to prevent the flow of the fluid to the outlet port, wherein the moveable valve body is arranged to be freely moveable by the Bernoulli effect to perform said controlling the flow when not actuated to the closed position by the temperature responsive device, wherein the temperature responsive device comprises an expandable structure comprising a sealed structure at least partially filled with an expandable material, wherein said expandable material and hence also said expandable structure are arranged to expand and cause a displacement of the movable valve body towards its closed position when the temperature of the fluid exceeds a predetermined temperature, wherein the self-adjustable valve has a flow path from the inlet port to the outlet port via a flow path portion to guide flow of the fluid over a surface of the movable valve body to thereby, when the moveable valve body is not actuated to the closed position by the temperature responsive device and is freely movable, autonomously move the moveable valve body to control said flow by exploiting the Bernoulli principle, wherein the expandable structure is arranged in a fluid chamber in the valve, which chamber contains the movable valve body to control the fluid flow through the valve, and wherein the expandable structure is either one of:
attached to a portion of the fluid chamber and expandable into contact with said movable valve body; or
attached to the movable valve body and expandable into contact with said fluid chamber.

2. The self-adjustable valve according to claim 1, wherein the expandable structure is arranged in a fluid conduit in parallel with the fluid flow through the valve.

3. The self-adjustable valve according to claim 1, wherein the expandable structure is arranged in a fluid conduit in series with the fluid flow through the valve.

4. The self-adjustable valve according to claim 1, wherein the expandable structure contains a fluid material.

5. The self-adjustable valve according to claim 1, wherein the expandable structure contains a fluid arranged to undergo a phase change at the predetermined temperature.

6. The self-adjustable valve according to claim 1, wherein the expandable structure contains a fluid having a lower boiling point than water at the pressure in the reservoir surrounding the production pipe.

7. The self-adjustable valve according to claim 6, wherein the fluid contained in the expandable structure comprises an alcohol.

8. The self-adjustable valve according to claim 6, wherein the fluid contained in the expandable structure comprises an alcohol/water mixture.

9. The self-adjustable valve according to claim 6, wherein the fluid contained in the expandable means comprises acetone.

10. The self-adjustable valve according to claim 1, wherein that the expandable structure is arranged to expand in a predetermined direction.

11. The self-adjustable valve according to claim 1, wherein the expandable structure comprises a bellows.

12. The self-adjustable valve according to claim 1, wherein the fluid comprises at least on one of oil and/or gas including any water.

13. A method of controlling a self-adjustable valve having a movable valve body which adjusts the flow of a fluid from one space or area to another be exploiting the Bernoulli principle, said method comprising providing an expandable structure comprising a sealed structure at least partially filled with an expandable material, and causing said movable valve body to move towards a closed position as a result of expansion of said expandable material and hence also said expandable structure when the temperature of the fluid exceeds a predetermined temperature, wherein the moveable valve body is arranged to be freely moveable by the Bernoulli effect to perform said adjusting the flow when not actuated by the temperature responsive device, wherein the method comprises flowing of the flow of fluid over a surface of the movable valve body to thereby, when the moveable valve body is not moved to be at the closed position by said expandable structure and is freely movable, autonomously move the moveable valve body to control said flow by exploiting the Bernoulli principle, said closed position being to prevent said flow of the fluid, wherein the expandable structure is arranged in a fluid chamber in the valve, which chamber contains the movable valve body controlling the fluid flow through the valve, and wherein the expandable structure is either one of:
   attached to a portion of the fluid chamber and expands into contact with said movable valve body; or
   attached to the movable valve body and expands into contact with said fluid chamber.

* * * * *